(12) United States Patent
Patterson et al.

(10) Patent No.: US 7,422,283 B2
(45) Date of Patent: Sep. 9, 2008

(54) CHILD RESTRAINT SYSTEM AND METHOD FOR MONITORING INSTALLATION OF THE CHILD RESTRAINT SYSTEM

(75) Inventors: James F. Patterson, Greentown, IN (US); Stuart S. Sullivan, Peru, IN (US); Duane D. Fortune, Lebanon, IN (US); William W. Fultz, Carmel, IN (US); Kevin D. Kincaid, Kokomo, IN (US); Rodney A. Lawrence, Frankfort, IN (US); Edward J. Wallner, Westfield, IN (US); Stephen B. Porter, Noblesville, IN (US)

(73) Assignee: Delphi Technologies, Inc., Troy, MI (US)

(*) Notice: Subject to any disclaimer, the term of this patent is extended or adjusted under 35 U.S.C. 154(b) by 335 days.

(21) Appl. No.: 11/146,926

(22) Filed: Jun. 6, 2005

(65) Prior Publication Data
US 2005/0275276 A1 Dec. 15, 2005

Related U.S. Application Data

(60) Provisional application No. 60/607,988, filed on Sep. 8, 2004, provisional application No. 60/577,546, filed on Jun. 7, 2004.

(51) Int. Cl.
*B60N 2/26* (2006.01)
(52) U.S. Cl. .............. 297/250.1; 297/217.2; 297/217.3; 297/468

(58) Field of Classification Search ............. 297/250.1, 297/468, 483, 217.3, 217.2; 280/801.1; 116/67 R
See application file for complete search history.

(56) References Cited

U.S. PATENT DOCUMENTS 3,440,602 A * 4/1969 Frig ..................... 340/457.1
5,181,773 A * 1/1993 Colvin ..................... 362/488

(Continued)

FOREIGN PATENT DOCUMENTS

GB 2290505 1/1996

*Primary Examiner*—Sarah B McPartlin
(74) *Attorney, Agent, or Firm*—Douglas D. Fekete (57) ABSTRACT

A child restraint system and a method for monitoring installation of the child restraint system are provided. The child restraint system includes a child seat configured to receive a child occupant. The child seat has at least a first seat belt guide member configured to engage a vehicle seat belt webbing for securing the child seat to a vehicle seat. The child restraint system further includes a first sensor coupled to the first seat belt guide member. The first sensor is configured to output a first signal indicative of an amount of tension being applied to the vehicle seat belt webbing. The child restraint system further includes a controller coupled to the child seat configured to receive the first signal and to compute a first tension value based on the first signal. The controller further is configured to induce a first device disposed on the child seat to indicate when the first tension value is less than a predetermined tension value.

19 Claims, 9 Drawing Sheets

U.S. PATENT DOCUMENTS

| | | | |
|---|---|---|---|
| 5,656,994 A | 8/1997 | Heninger | 340/457.1 |
| 5,711,574 A | 1/1998 | Barnes | 297/216.11 |
| 5,720,519 A | 2/1998 | Barnes | 297/216.11 |
| 5,965,827 A | 10/1999 | Stanley et al. | |
| 6,102,440 A * | 8/2000 | Bergkessel | 280/808 |
| 6,151,540 A | 11/2000 | Anishetty | 701/45 |
| 6,246,936 B1 | 6/2001 | Murphy et al. | 701/45 |
| 6,259,042 B1 | 7/2001 | David | |
| 6,264,236 B1 | 7/2001 | Aoki | |
| 6,272,936 B1 | 8/2001 | Oreper et al. | 73/862.621 |
| 6,371,516 B1 | 4/2002 | Miyagawa | 280/735 |
| 6,438,476 B1 | 8/2002 | Gray et al. | 701/45 |
| 6,490,936 B1 | 12/2002 | Fortune et al. | 73/862.581 |
| 6,502,860 B1 | 1/2003 | Siegfried et al. | |
| 6,554,318 B2 | 4/2003 | Kohut et al. | 280/801.1 |
| 6,578,871 B2 | 6/2003 | Gray et al. | 280/735 |
| 6,587,770 B1 | 7/2003 | Gray et al. | 701/45 |
| 6,595,545 B2 | 7/2003 | Curtis et al. | |
| 6,605,877 B1 | 8/2003 | Patterson et al. | 307/10.1 |
| 6,644,689 B2 | 11/2003 | Murphy | 280/735 |
| 6,650,978 B1 | 11/2003 | Patterson et al. | 701/35 |
| 6,662,094 B2 | 12/2003 | Murphy et al. | 701/45 |
| 6,683,534 B2 | 1/2004 | Patterson et al. | 340/436 |
| 6,749,038 B2 | 6/2004 | Sullivan et al. | 180/268 |
| 6,796,192 B2 | 9/2004 | Sullivan et al. | 73/862.391 |
| 6,812,844 B1 | 11/2004 | Burgess | 340/573.1 |
| 6,818,842 B2 | 11/2004 | Gray et al. | 177/144 |
| 6,847,302 B2 | 1/2005 | Flanagan et al. | 340/666 |
| 6,850,825 B2 | 2/2005 | Murphy et al. | 701/45 |
| 6,851,503 B2 | 2/2005 | Almaraz et al. | 180/268 |
| 6,854,415 B2 | 2/2005 | Barnes et al. | 116/67 R |
| 6,868,745 B2 | 3/2005 | Sullivan et al. | 73/862.391 |
| 6,889,146 B2 | 5/2005 | Sullivan et al. | 702/43 |
| 6,958,451 B2 | 10/2005 | Breed et al. | |
| 7,021,709 B2 | 4/2006 | Dolan et al. | |
| 7,029,068 B2 | 4/2006 | Yoshida et al. | |
| 2004/0051355 A1 * | 3/2004 | Maciejczyk | 297/250.1 |
| 2004/0068354 A1 * | 4/2004 | Tabe | 701/45 |
| 2004/0113634 A1 | 6/2004 | Stanley et al. | |
| 2004/0113797 A1 | 6/2004 | Osborne | |
| 2005/0092539 A1 | 5/2005 | Chitalia et al. | |
| 2005/0121956 A1 | 6/2005 | Dolan et al. | |
| 2005/0189805 A1 | 9/2005 | Burley et al. | |
| 2005/0194779 A1 | 9/2005 | Ito et al. | |

* cited by examiner

CHILD RESTRAINT SYSTEM AND METHOD FOR MONITORING INSTALLATION OF THE CHILD RESTRAINT SYSTEM

CROSS REFERENCE TO RELATED APPLICATIONS

The application claims the benefit of U.S. Provisional application, Ser. No. 60/577,546, filed Jun. 7, 2004, the contents of which are incorporated herein by reference thereto.

The application also claims the benefit of U.S. Provisional application, Ser. No. 60/607,988, filed Sep. 8, 2004, the contents of which are incorporated herein by reference thereto.

This application is also related to the following United States Patent Applications filed contemporaneously herewith: CHILD RESTRAINT SYSTEM AND METHOD FOR MONITORING INSTALLATION OF THE CHILD RESTRAINT SYSTEM, PCT/US05/19872, CHILD SEAT AND MONITORING SYSTEM, PCT/US05/20050; CHILD SEAT AND MONITORING SYSTEM, Ser. No. 11/146,928; CHILD SEAT MONITORING SYSTEM AND METHOD FOR DETERMINING A TYPE OF CHILD SEAT, PCT/US05/20046; CHILD RESTRAINT SYSTEM COMPRISING WEIGHT SENSOR, Ser. No. 11/146,921; CHILD RESTRAINT SYSTEM COMPRISING CONTROL UNIT FOR EVALUATING HARNESS ADJUSTMENT, Ser. No. 11/147,149. The contents of which are each incorporated herein by reference thereto.

TECHNICAL FIELD

This application relates to a child restraint system and a method for monitoring installation of the child restraint system.

BACKGROUND

Child restraint systems have been utilized to hold infants or children therein within vehicles. A first type of child restraint system includes a child seat and a base portion for holding the seat, that are rearward-facing with respect to a vehicle seat. In this type of child restraint system, the child seat is secured in the base portion and a vehicle seat belt webbing is used to secure the base portion to the vehicle seat. A second type of child restraint system utilizes a rearward-facing child seat that is secured via the vehicle seat belt webbing to the vehicle seat. A third type of child restraint system is a booster child seat that is frontward-facing with respect to the vehicle seat and is secured via the vehicle seat belt webbing to the vehicle seat.

During installation of any of the foregoing types of child restraint systems in a vehicle, if a sufficient amount of tension is applied to the vehicle seat belt webbing to secure the child seat, rotation of the child seat with respect to a vehicle seat is restricted which assists in protecting a child disposed in the child seat. However, if an insufficient amount of tension is applied to the vehicle seat belt webbing when securing the child seat, the child seat may rotate more than desired.

Accordingly, the inventors herein have recognized a need for a child restraint system that can notify a person when a desired amount of tension is being applied to the vehicle seat belt webbing when securing a child restraint system on a vehicle seat.

SUMMARY

A child restraint system adapted to be mounted within a vehicle in accordance with an exemplary embodiment is provided. The child restraint system includes a child seat configured to receive a child occupant. The child seat has at least a first seat belt guide member configured to engage a vehicle seat belt webbing for securing the child seat to a vehicle seat. The child restraint system further includes a first sensor coupled to the first seat belt guide member. The first sensor is configured to output a first signal indicative of an amount of tension being applied to the vehicle seat belt webbing. The child restraint system further includes a controller coupled to the child seat configured to receive the first signal and to compute a first tension value based on the first signal. The controller further is configured to induce a first device disposed on the child seat to indicate when the first tension value is less than a predetermined tension value.

A method for monitoring installation of a child restraint system on a vehicle seat in accordance with another exemplary embodiment is provided. The child restraint system has a child seat configured to receive a child occupant. The child seat has at least a first seat belt guide member configured to engage a vehicle seat belt webbing for securing the child seat to the vehicle seat. The method includes outputting a first signal from a first sensor disposed on the first seat belt guide member of the child seat. The first signal is indicative of an amount of tension being applied to the vehicle seat belt webbing. The method further includes computing a first tension value based on the first signal utilizing a controller. The method further includes inducing a first device disposed on the child seat to indicate when the first tension value is less than a predetermined tension value, utilizing the controller.

DESCRIPTION OF EXEMPLARY EMBODIMENTS

Figure 1:
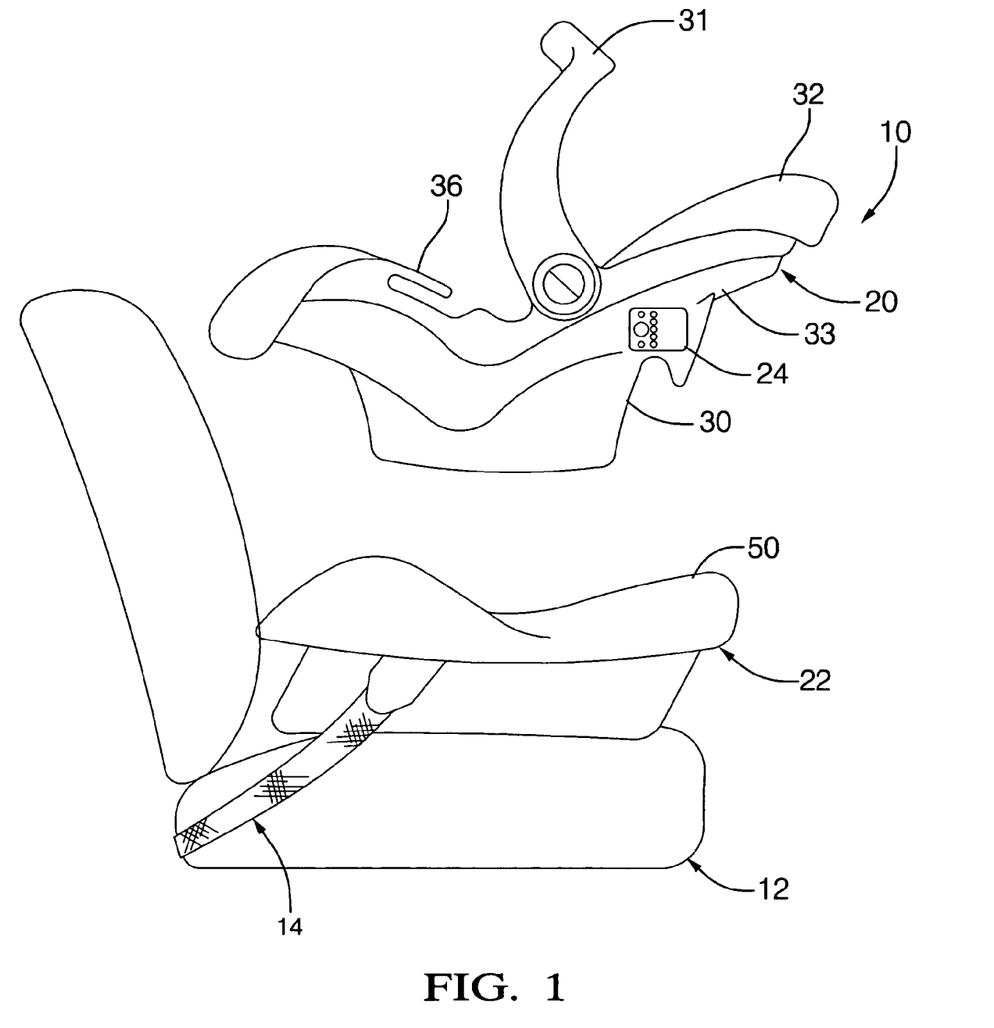
FIG. 1 is a diagram of a child restraint system in accordance with exemplary embodiment.
Figure 3:
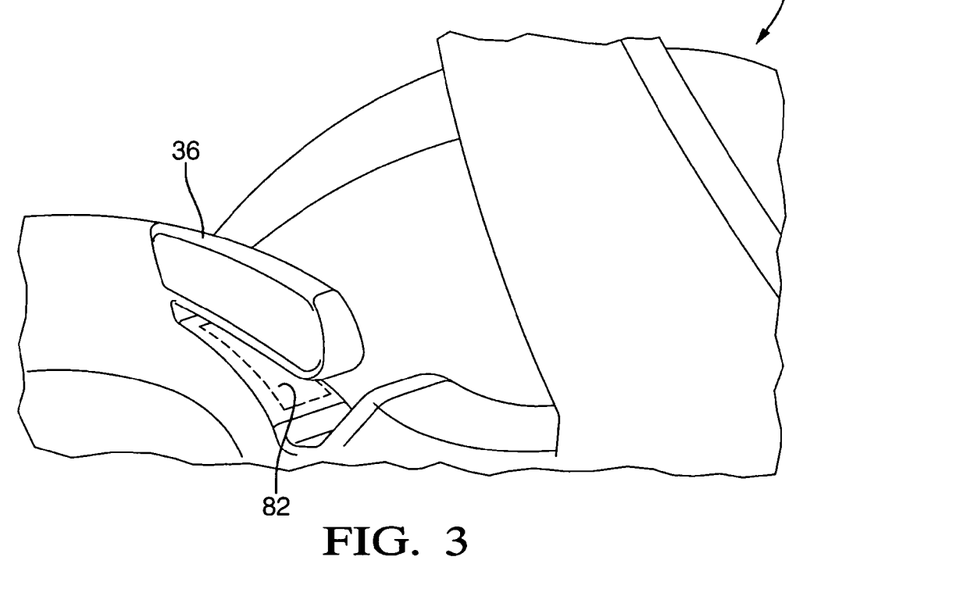
FIG. 3 is enlarged view of a portion of a child seat of the child restraint system of FIG. 1.
Figure 4:
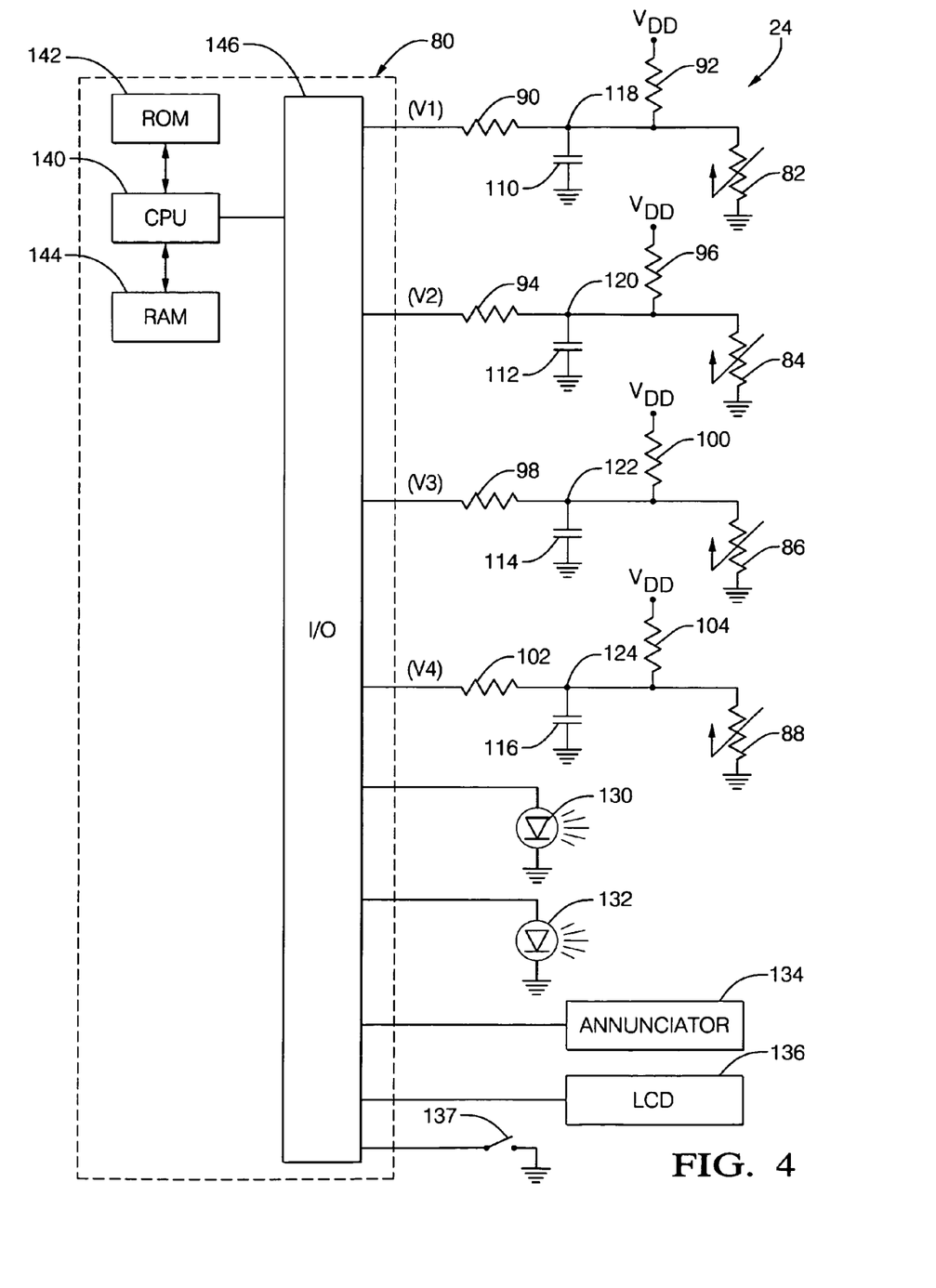
FIG. 4 is an electrical schematic of a seat belt tension monitoring system utilized in the child restraint system of FIG. 1.

Referring to FIGS. 1, 3 and 4, a child restraint system 10 that can be secured to a vehicle seat 12 in accordance with exemplary embodiment is provided. In particular, the child restraint system 10 is secured to the vehicle seat 12 utilizing the vehicle seat belt webbing 14. The child restraint system 10 includes a child seat 20, a base portion 22, and a seat belt tension monitoring system 24.

Referring to FIG. 1, the child seat 20 comprises a rearward facing child seat that is configured to accommodate a child therein for transporting the child both inside and outside of a vehicle. The child seat 20 is configured to be fixedly secured to the base portion 22 and the base portion 22 is further secured via the vehicle seat belt webbing 14 to the seat 12 or to a frame of a vehicle. The child seat 20 includes a shell 30, the handle 31, and a cushion 32.

The shell 30 is constructed from a rigid polymeric material and defines a compartment for accommodating the child. The shell 30 includes a back portion 33, a seat portion 34, and a pair of seat belt guide members 36. The back portion 33 supports a back of the child and the seat portion 34 supports the buttocks and legs of the child. A compartment defined by the shell 34 is lined with the cushion 32. The pair of seat belt guide members 36 (one of which shown in FIG. 1) are disposed on opposite sides of the shell 30 and are configured to form an inner groove for receiving the vehicle seat belt webbing 14 therethrough.

The handle 31 is coupled to shell 30 and is provided to allow a user to easily lift the child seat 20. The handle 31 is constructed from a rigid polymeric material.

Figure 2:
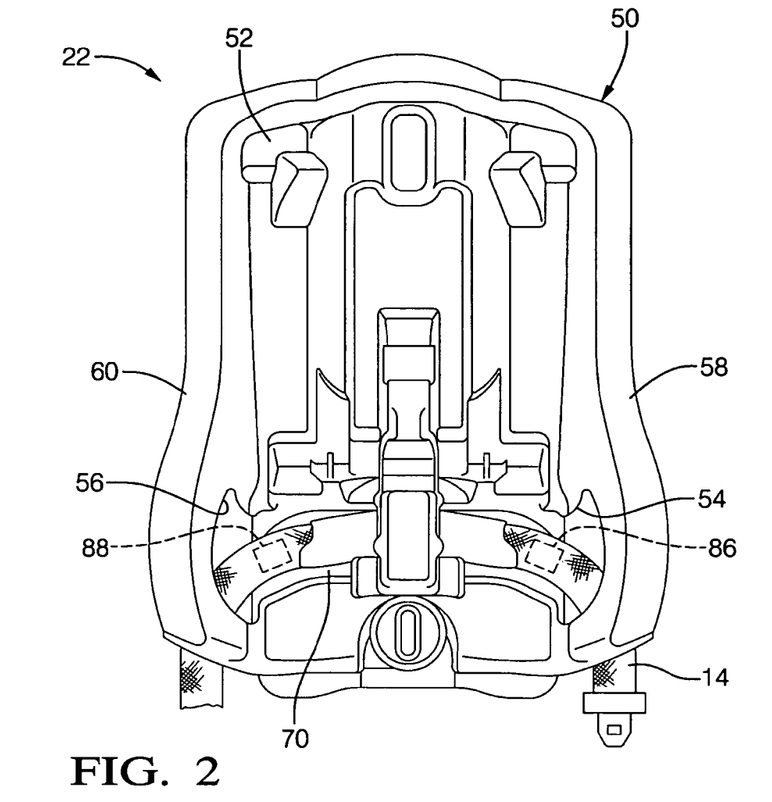
FIG. 2 is a top view of a base portion of the child restraint system of FIG. 1.

Referring to FIG. 2, the base portion 22 is provided to receive the child seat 20 therein. The base portion 22 has a shell 50 constructed from a rigid polymeric material. The shell 50 includes a bottom wall 52, and sidewalls 58, 60 coupled to the bottom wall 52. The side walls 58, 60 include apertures 54, 56, respectively, extending therethrough for receiving the vehicle seat belt webbing 14. The bottom wall 52 includes a seat belt guide portion 70 for guiding vehicle seat belt webbing 14 from the aperture 54 in the side wall 58 to the aperture 56 in the side wall 60.

Referring to FIG. 4, the seat belt tension monitoring system 24 is provided to monitor a tension of the vehicle seat belt webbing 14 and to provide an indication to a user as to whether the tension is less than or greater than a predetermined tension value. The seat belt tension monitoring system 24 includes a controller 80, force sensors 82, 84, 86, 88, resistors 90, 92, 94, 96, 98, 100, 102, 104 capacitors 110, 112, 114, 116, light emitting diodes (LEDs) 130, 132, an annunciator 134, a liquid crystal display (LCD) 136, and a switch 137.

The controller 80 is provided to monitor the output of the force sensors 82, 84, 86, 88 and to calculate a tension applied to the vehicle seat belt webbing 14. The controller 80 is further provided to control operation of the indicator devices including the LEDs 130, 132, the annunciator 134, and the LCD 136, as will be described in greater detail below. The controller 80 includes a central processing unit (CPU) 140, a read-only memory (ROM) 142, a volatile memory such as a random access memory (RAM) 144 and an input/output (I/O) interface 146. The CPU 140 operably communicates with the ROM 142, the RAM 144, and the I/O interface 146. The computer readable media including ROM 142 and RAM 144 may be implemented using any of a number of known memory devices such as PROMs, EPROMs, EEPROMS, flash memory or any other electric, magnetic, optical or combination memory device capable of storing data, some of which represent executable instructions used by the CPU 140.

Figure 5:
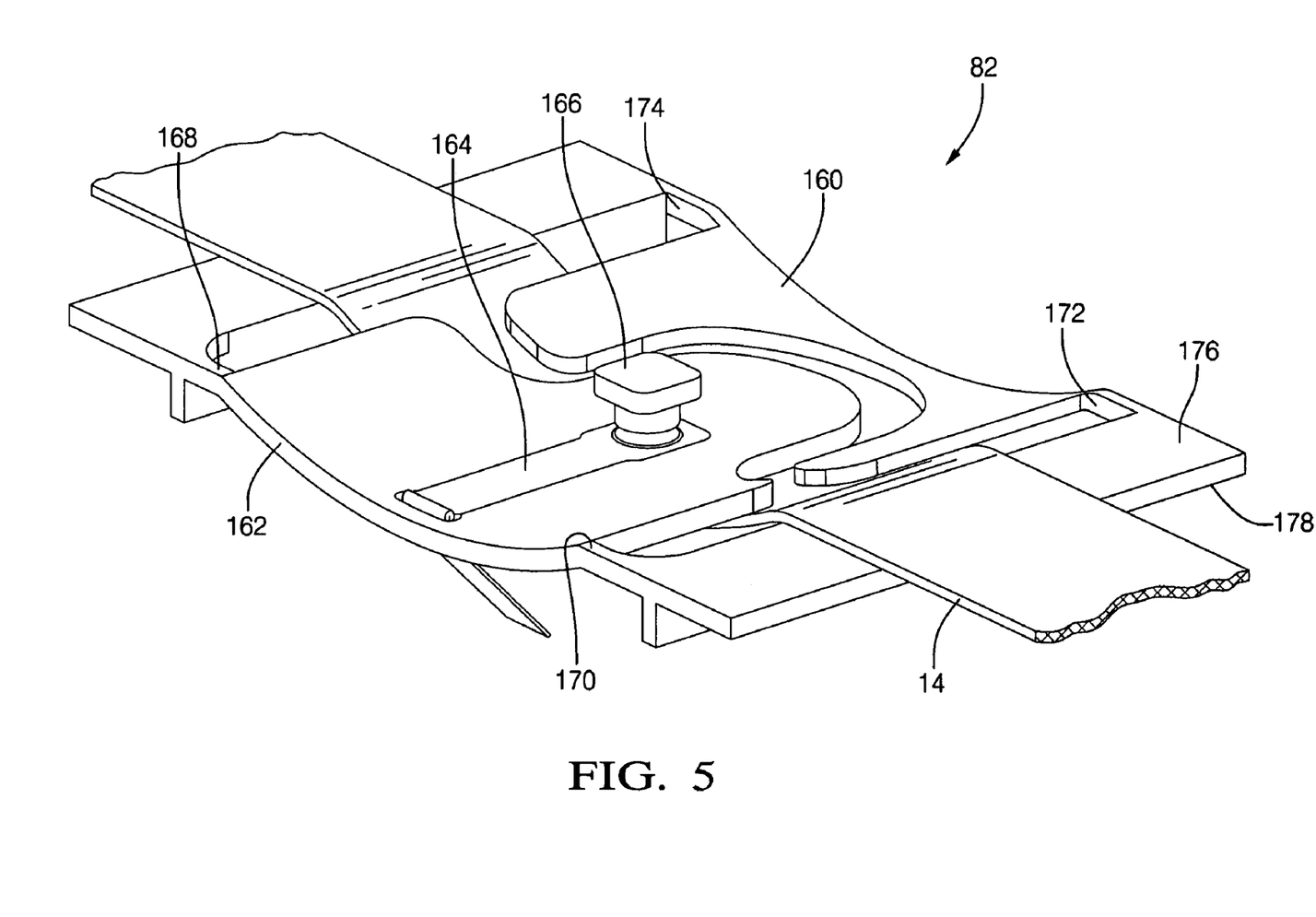
FIG. 5 is a schematic of a force sensor utilized in the seat belt tension monitoring system of FIG. 4.
Figure 6:
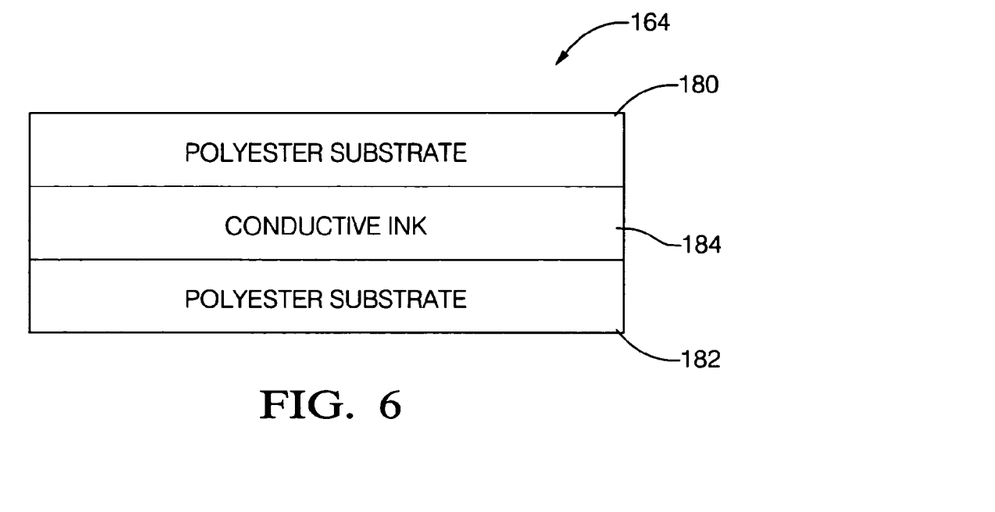
FIG. 6 is a diagram of a portion of the force sensor of FIG. 5.
Figure 7:
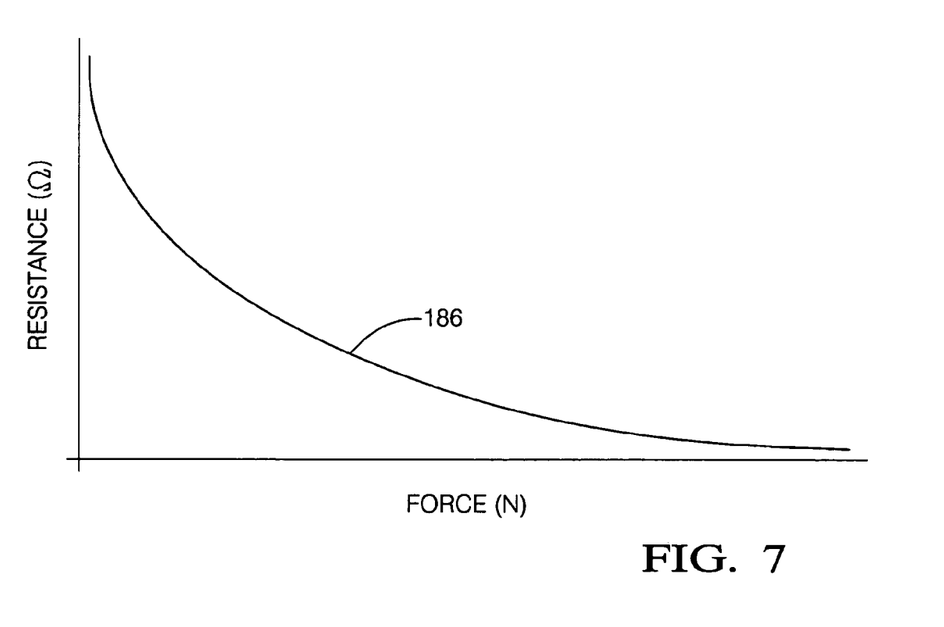
FIG. 7 is a plot of the curve indicating electrical resistance versus force characteristics of the force sensor of FIG. 5.

Referring to FIGS. 4-6, the force sensors 82, 84, 86, 88 are provided to output signals (V1), (V2), (V3), (V4), respectively, indicative of a tension be applied to the vehicle seat belt webbing 14. The force sensors 82, 84, 86, 88 comprise piezoresistive force sensors and have an identical construction with one another. Referring to FIG. 7, a curve 186 indicates an operational characteristics of each of the force sensors 82, 84, 86, 88. In particular, the curve 186 indicates that as a force applied to a force sensor is increased, a resistance of the force sensor is decreased. It should be noted that in an alternate embodiment, the force sensors 82, 84, 86, 88 can comprise any other type of force sensor known to those skilled and the art, that is capable of detecting a tension applied to the vehicle seat belt webbing 14. Referring to FIGS. 1 and 3, the force sensors 82, 84 are disposed proximate the pair of seat belt guide members 36, respectively. Referring to FIG. 2, the force sensors 86, 88 are disposed on the seat belt guide member 70 between the seat belt guide member and the vehicle seat belt webbing 14. For purposes of simplicity, only the structure of the force sensor 82 will be explained.

Referring to FIG. 5, the force sensor 82 includes a frame portion 160, a deflection member 162, a force sensor strip 164, and a contact 166. The frame portion 160 includes slots 170, 174 disposed therethrough on opposite sides of the deflection member 162 for receiving the vehicle seat belt webbing 14 is therethrough. The frame portion 160 can be either integrally molded within the shell 30 of the child seat 20 or fixedly attached to the shell 30. The frame portion 160 is operably coupled to the deflection member 162 at pivot points 168, 170 which are adjacent the slots 172, 174, respectively. The vehicle seat belt webbing 14 routed over the surface 176 and through the slot 172 and further routed over the underside surface 178 of the deflection member 162. Thereafter, the vehicle seat belt webbing 14 is routed through the slot 174 and over the surface 176 on an opposite side of the frame portion 160.

Referring to FIGS. 5 and 6, the force sensor strip 164 is disposed on the surface 176 of the deflection member 162 a predetermined distance from the stationary contact 166. The force sensor strip 164 includes a conductive ink layer 184 that is disposed between polyester layers 180, 182. When a tensional force is applied to the vehicle seat belt webbing 14, the vehicle seat belt webbing 14 applies a substantially perpendicular force against the deflection member 162 that induces the member 162 to move towards the stationary contact 166. The stationary contact 166 is fixedly coupled to the shell 33. When the force sensor strip 164 disposed on the deflection member 162 is pushed against the contact 166, a force applied to the force sensor strip 164 reduces a resistance of the conductive ink layer 84 that is proportional to the applied force. Accordingly, the resistance of the conductive ink layer 84 is proportional to the force being applied to the force sensor strip 164 by the vehicle seat belt webbing 14, that is further proportional to the tension being applied to the vehicle seat belt webbing 14.

Referring again to FIG. 4, the remainder of the seat belt tension monitoring system 24 will now be explained. The resistor 90 is electrically coupled between a node 118 and the I/O interface 146. The capacitor 110 is electrically coupled between the node 118 and electrical ground. The resistor 92 is electrically coupled between a voltage source Vdd and the node 118. The force sensor 82 is electrically coupled between the node 118 and the electrical ground. In particular, the conductive ink layer 184 of the force sensor strip 162 in the force sensor 82 is electrically coupled between the node 118 and the electrical ground. During operation, when an increasing force is applied to the force sensor 82 by the vehicle seat belt webbing 14, a resistance of conductive ink layer 184 is decreased which results in an amplitude of the voltage signal (V1) being decreased. Alternately, when the force applied to the force sensor 82 is reduced, a resistance of conductive ink layer 184 is increased which results in an amplitude of the voltage signal (V1) being increased.

The resistor 94 is electrically coupled between a node 120 and the I/O interface 146. The capacitor 112 is electrically coupled between the node 120 and electrical ground. The resistor 96 is electrically coupled between a voltage source Vdd and the node 120. The force sensor 84 is electrically coupled between the node 120 and the electrical ground. In particular, a conductive ink layer of the force sensor strip in the force sensor 84 is electrically coupled between the node 120 and the electrical ground. During operation, when an increasing force is applied to the force sensor 84 by the vehicle seat belt webbing 14, a resistance of conductive ink layer therein is decreased which results in an amplitude of the voltage signal (V2) being decreased. Alternately, when the force applied to the force sensor 84 is reduced, a resistance of conductive ink layer therein is increased which results in an amplitude of the voltage signal (V2) being increased.

The resistor 98 is electrically coupled between a node 122 and the I/O interface 146. The capacitor 114 is electrically coupled between the node 122 and electrical ground. The resistor 100 is electrically coupled between a voltage source Vdd and the node 122. The force sensor 86 is electrically coupled between the node 122 and the electrical ground. In particular, a conductive ink layer of the force sensor strip in the force sensor 86 is electrically coupled between the node 122 and the electrical ground. During operation, when an increasing force is applied to the force sensor 86 by the vehicle seat belt webbing 14, a resistance of conductive ink layer therein is decreased which results in an amplitude of the voltage signal (V3) being decreased. Alternately, when the force applied to the force sensor 86 is reduced, a resistance of conductive ink layer therein is increased which results in an amplitude of the voltage signal (V3) being increased.

The resistor 102 is electrically coupled between a node 124 and the I/O interface 146. The capacitor 116 is electrically coupled between the node 124 and electrical ground. The resistor 104 is electrically coupled between a voltage source Vdd and the node 124. The force sensor 88 is electrically coupled between the node 124 and the electrical ground. In particular, a conductive ink layer of the force sensor strip in the force sensor 80 is electrically coupled between the node 124 and the electrical ground. During operation, when an increasing force is applied to the force sensor 88 by the vehicle seat belt webbing 14, a resistance of conductive ink layer therein is decreased which results in an amplitude of the voltage signal (V4) being decreased. Alternately, when the force applied to the force sensor 88 is reduced, a resistance of conductive ink layer therein is increased which results in an amplitude of the voltage signal (V4) being increased.

It should be noted that the force sensors 86, 88 are electrically coupled to the controller 80 through an electrical wiring harness (not shown), using a plug and a socket to allow the child seat 20 to be detached from the base portion 22. In another alternate embodiment, the force sensors 86, 88 are operably coupled to one or more radio frequency (RF) transmitters that transmit RF signals having information indicative of the measured tension, and the seat belt tension monitoring system 24 includes an RF receiver operably coupled to the controller 80 configured to receive the RF signals, to allow wireless communication therebetween.

The LED 130 is provided to emit light having a first color to indicate when a measured tension of the vehicle seat belt webbing 14 is greater than or equal to the predetermined tension value. The LED 132 is provided to emit light having a second color to indicate when a measured tension of the vehicle seat belt webbing is less than a predetermined tension value. As shown, the LEDs 130, 132 are electrically coupled between the I/O interface 146 and electrical ground.

The electrical annunciator 134 is provided to emit a first audible sound when a measured tension of the vehicle seat belt webbing 14 is less than a predetermined tension value, in response to a control signal from the controller 80. The electrical annunciator 134 is further provided to emit a second audible sound when a measured tension of the vehicle seat belt webbing 14 is greater than or equal to the predetermined tension value, in response to another control signal from the controller 80. The annunciator 134 is electrically coupled to the I/O interface 146.

The LCD 136 is provided to display a first message when a measured tension of the vehicle seat belt webbing 14 is less than a predetermined tension value, in response to a control signal from the controller 80. The LCD 136 is further provided to display a second message when a measured tension of the vehicle seat belt webbing 14 is greater than or equal to the predetermined tension value, in response to a control signal from the controller 80. The LCD 136 is electrically coupled to the I/O interface 146. The switch 137 is provided to induce the controller 80 to monitor installation of the child restraint system 10 in accordance with the method of FIGS. 8-10. In particular, when the switch 137 is moved to a closed operational position, the controller 80 monitors installation of the child restraint system 10. The switch 137 is electrically coupled to the I/O interface 146.

It should be noted that in an alternate embodiment of the seat belt tension monitoring system 24, a single force sensor could be utilized in the child seat 20 and a single force sensor could be utilized in the base portion 22. Also, another type of force sensor, such as a piezo-resistive sensor, could be used in place of the conductive ink sensors 82, 84, 86, and 88. Further, one type of indicator (e.g., LED or annunciator or LCD) could be utilized to indicate whether the amount of tension being applied to the vehicle seat belt webbing 14 is less than a predetermined tension value or greater than or equal to the predetermined tension value.

Figure 8:
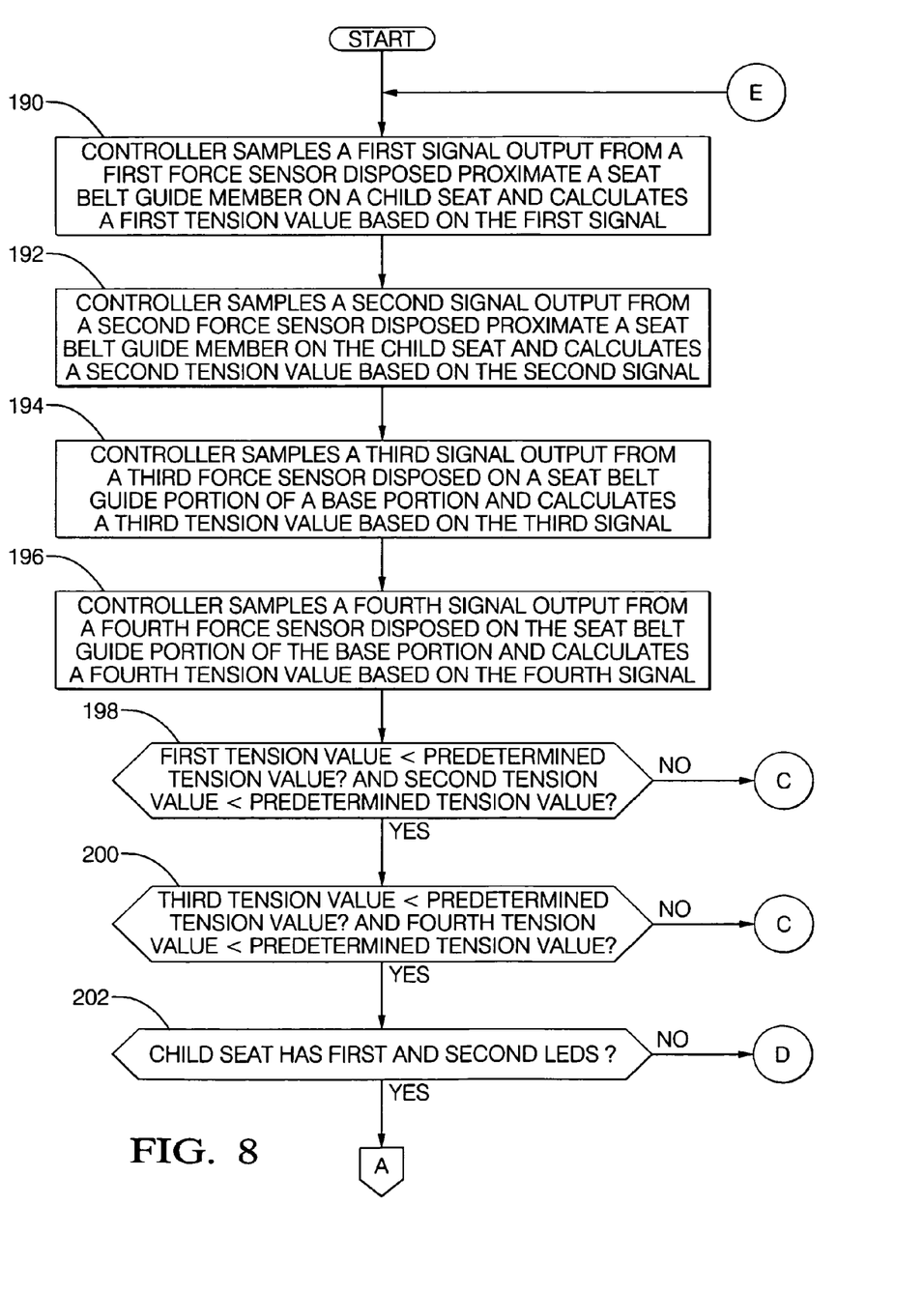
FIGS. 8-10 are flowcharts of a method for monitoring installation of the child restraint system of FIG. 1.
Figure 9:
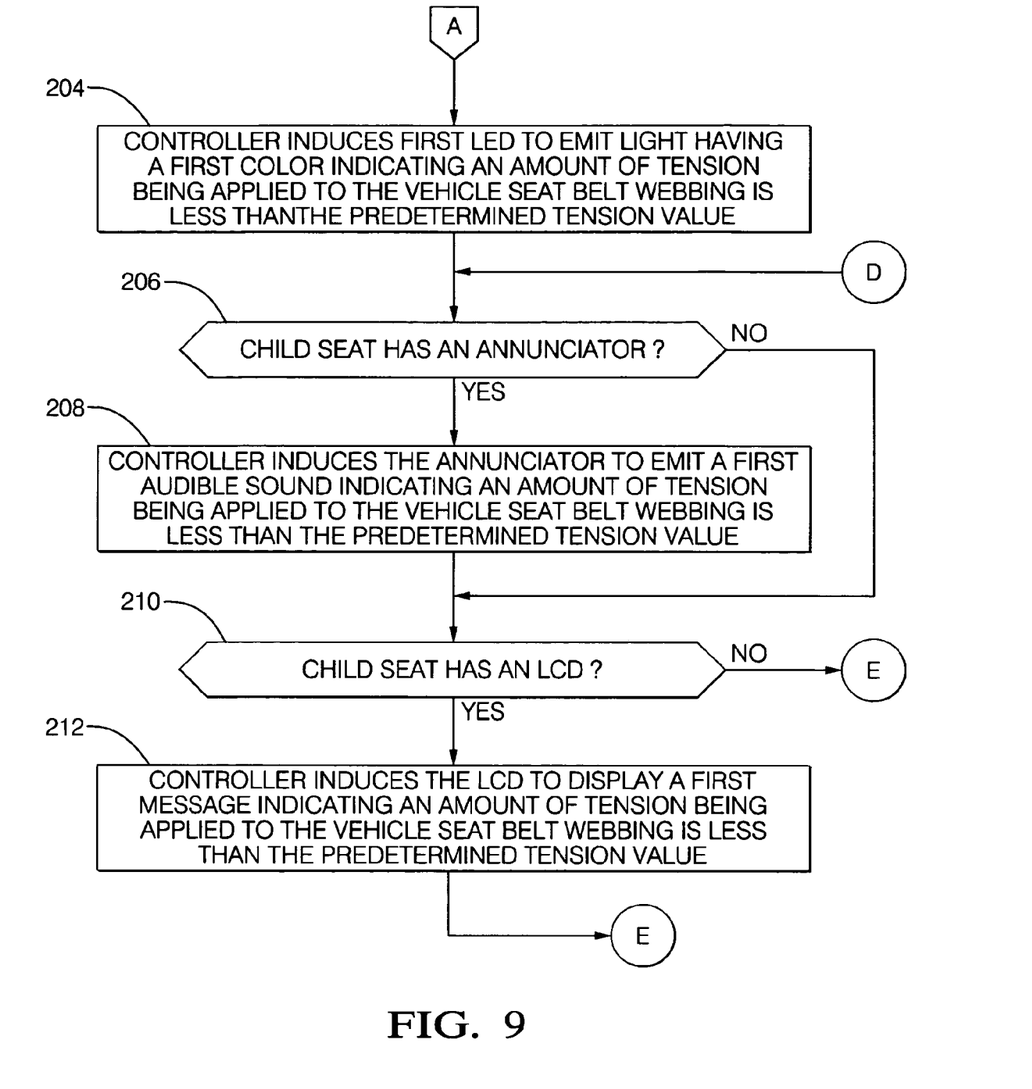
Figure 10:
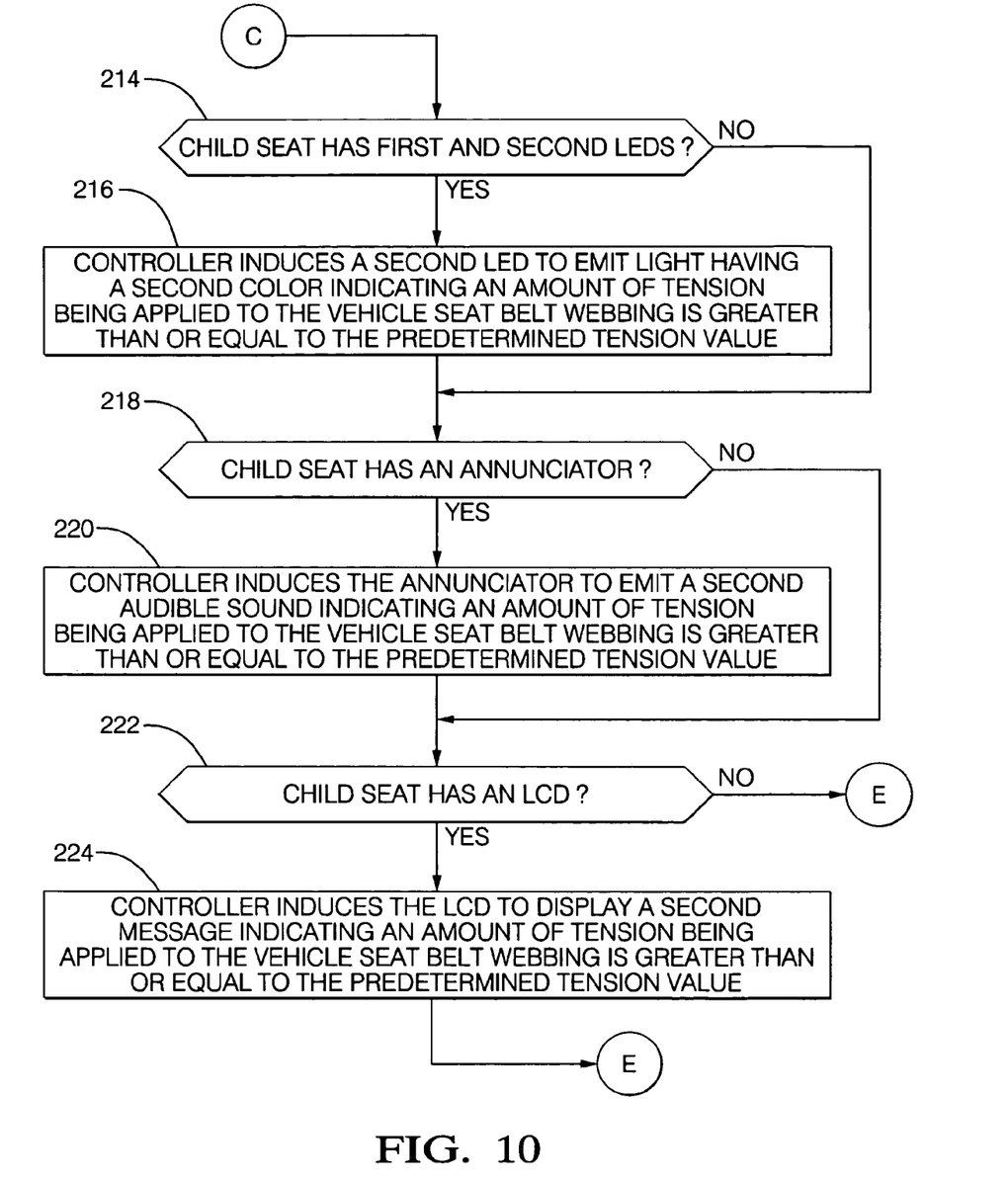

Referring to FIGS. 8-10, a method for monitoring installation of the child restraint system 10 is illustrated. The method can be implemented utilizing software algorithms executed by the controller 80 of the seat belt monitoring system 24.

At step 190, the controller 80 samples a signal (V1) output from the force sensor 82 disposed proximate a first seat belt guide member 36 on the child seat 20 and calculates a first tension value based on the signal (V1).

At step 192, the controller 80 samples a signal (V2) output from a force sensor 84 disposed proximate a second seat belt guide member 36 on the child seat 20 and calculates a second tension value based on the signal (V2).

At step 194, the controller 80 samples a signal (V3) output from a force sensor 86 disposed on a seat belt guide portion 70 of a base portion 22 and calculates a third tension value based on the signal (V3).

At step 196, the controller 80 samples a signal (V4) output from a force sensor 88 disposed on the seat belt guide portion 70 of the base portion 22 and calculates a fourth tension value based on the signal (V4).

At step 198, the controller 80 makes a determination as to whether: (i) the first tension value is less than a predetermined tension value, and (ii) the second tension value is less than a predetermined tension value. If the value of step 198 equals "yes", the method advances to step 200. Otherwise, the method advances to step 214.

At step 200, the controller 80 makes a determination as to whether: (i) the third tension value is less than the predetermined tension value, and (ii) the fourth tension value is less than in the predetermined tension value. If the value of step 200 equals "yes", the method advances to step 202. Otherwise, the method advances to step 214.

At step 202, the controller 80 makes a determination as to whether the child seat 10 has LEDs 130, 132. If the value of step 202 equals "yes", the method advances to step 204. Otherwise, the method advances to step 206.

At step 204, the controller 80 induces the LED 130 to emit light having a first color indicating an amount of tension being applied to the vehicle seat belt webbing 14 is less than the predetermined tension value. After step 204, the method advances to step 206.

At step 206, the controller 80 makes a determination as to whether the child seat 20 has an annunciator 134. If the value of step 206 equals "yes", the method advances step 208. Otherwise, the method advances to step 210.

At step 208, the controller 80 induces the annunciator 134 to emit a first audible sound indicating an amount of tension being applied to the vehicle seat belt webbing 14 is less than the predetermined tension value. After step 208, method advances to step 210

At step 210, the controller 80 makes a determination as to whether the child seat 20 has an LCD 136. If the value of step 210 equals "yes", the method advances to step 212. Otherwise, method advances to step 190.

At step 212, the controller 80 induces the LCD 136 to display a first message indicating an amount of tension being applied to the vehicle seat belt webbing is less than the predetermined tension value. After step 212, the method advances to step 190.

Referring to steps 198, 200, when the value of either of the steps equals "no", the method advances to step 214.

At step 214, the controller 80 makes a determination as to whether the child seat 20 has the LEDs 130, 132. If the value of step 214 equals "yes", the method advances to step 216. Otherwise, the method advances to step 218.

At step 216, the controller 80 induces the LED 132 to emit light having a second color indicating an amount of tension being applied to the vehicle seat belt webbing 14 is greater than or equal to the predetermined tension value. After step 216, the method advances to step 218.

At step 218, the controller 80 makes a determination as to whether the child seat 20 has the annunciator 134. If the value of step 218 equals "yes", the method advances to step 220. Otherwise, the method advances to step 222.

At step 220, the controller 80 induces the annunciator 134 to emit a second audible sound indicating an amount of tension being applied to the vehicle seat belt webbing 14 is greater than or equal to the predetermined tension value. After step 220, the method advances to step 222.

At step 222, the controller 80 makes a determination as to whether the child seat 20 has the LCD 136. If the value of step 222 equals "yes", the method advances to step 224. Otherwise, the method advances to step 190.

At step 224, the controller 80 induces the LCD 136 to display a second message indicating an amount of tension being applied to the vehicle seat belt webbing 14 is greater than or equal to the predetermined tension value. After step 224, method advances to step 190.

Figure 11:
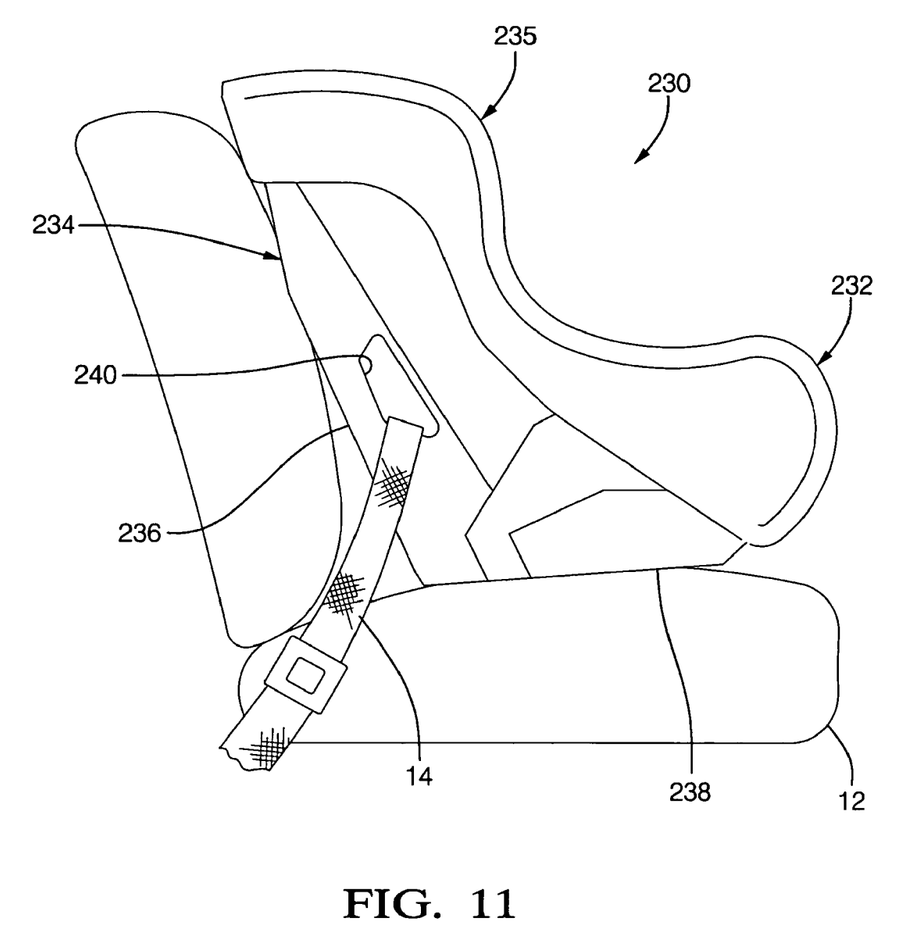
FIG. 11 is a diagram of a child restraint system in accordance with another exemplary embodiment.

Referring to the FIG. 11, a child restraint system 230 that can be secured to a vehicle seat 12 in accordance with another exemplary embodiment is provided. In particular, the child restraint system 230 is secured to the vehicle seat 12 utilizing the vehicle seat belt webbing 14. The child restraint system 230 includes a child seat 232 and a portion of a seat belt tension monitoring system 24.

The child seat 232 comprises a frontward-facing child seat that is configured to accommodate a child therein for transporting the child inside of a vehicle. The child seat 232 is configured to be fixedly secured via the vehicle seat belt webbing 14 to the seat 12 or to a frame of a vehicle. The child seat 232 includes a shell 234 and a cushion 235.

The shell 234 is constructed from a rigid polymeric material and defines a compartment for accommodating the child. The shell 234 includes a back portion 236, a seat portion 238, and a seat belt guide member (not shown) disposed in the back portion 236. The back portion 236 supports a back of the child and the seat portion 238 supports the buttocks and legs of the child. A compartment defined by the shell 234 is lined with the cushion 235. The back portion 236 includes an aperture 240 extending therethrough for receiving the vehicle seat belt webbing 14 therethrough.

The child restraint system 230 can utilize substantially all of the component of the seat belt tension monitoring system 24, except for the force sensors 86, 88, and the associated components provided to supply the voltage signals (V3), (V4) to the controller 80. It particular, the force sensors 82, 84 can be disposed on the back portion 236 proximate the aperture 240 to contact the vehicle seat belt webbing 14 for monitoring a seat belt tension applied to the vehicle seat belt webbing 14, as described above with respect to the child restraint system 10.

The child restraint system and a method for monitoring installation of the child restraint system provides a substantial advantage over other systems and methods. In particular, the child restraint system utilizes a controller to monitor the amount of tension being applied to the vehicle seat belt webbing when securing the child restraint system on a vehicle seat. Further, the controller induces at least one indicator device to notify a person when a desired amount of tension is being applied to vehicle seat belt webbing.

As described above, the method for monitoring installation of the child restraint system can be embodied in the form of computer-implemented processes and apparatuses for practicing those processes. In an exemplary embodiment, the method is embodied in computer program code executed by one or more elements. The present method may be embodied in the form of computer program code containing instructions embodied in tangible media, such as floppy diskettes, CD-ROMs, hard drives, flash memory, or any other computer-readable storage medium, wherein, when the computer program code is loaded into and executed by a computer, the computer becomes an apparatus for practicing the invention. The present method can also be embodied in the form of computer program code, for example, whether stored in a storage medium, loaded into and/or executed by a computer.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A child restraint system adapted to be mounted within a vehicle, the child restraint system comprising:

a child seat configured to receive a child occupant, the child seat having a first seat belt guide member and a second seat belt guide member configured to engage a vehicle seat belt webbing for securing the child seat to a vehicle seat;

a first sensor coupled to the first seat belt guide member, the first sensor configured to output a first signal indicative of an amount of tension being applied to the vehicle seat belt webbing at the first seatbelt guide member;

a second sensor disposed on the second seat belt guide portion and outputting a second signal indicative of an amount of tension being applied to the vehicle seat belt webbing at the second seat belt guide member; and a controller coupled to the child seat configured to receive the first signal and the second signal and to compute a first tension value based on the first signal and a second tension value based on the second signal and to induce a first device disposed on the child seat to indicate when one of said first tension value and said second tension value is less than a predetermined tension value.

2. The child restraint system of claim 1, wherein the first sensor comprises a piezo-resistive force sensor configured to adjust an amplitude of the first signal based on an amount of force applied to the first sensor by the vehicle seat belt webbing.

3. The child restraint system of claim 1, wherein the first device comprises a light-emitting diode, the controller configured to induce the light-emitting diode to emit light having a first color when the first tension value is less than the predetermined tension value.

4. The child restraint system of claim 1, wherein the first device comprises an electrical annunciator, the controller configured to induce the electrical annunciator to emit a first audible sound when the first tension value is less than the predetermined tension value, the controller further configured to induce the electrical annunciator to emit a second audible sound when the first tension value is greater than or equal to the predetermined tension value.

5. The child restraint system of claim 1, wherein the first device comprises a liquid-crystal display, the controller configured to induce the liquid-crystal display to display a first message when the first tension value is less than the predetermined tension value, the controller further configured to induce the liquid-crystal display to display a second message when the first tension value is greater than or equal to the predetermined tension value.

6. The child restraint system of claim 1, wherein the controller is further configured to induce a second device to indicate when the first tension value is greater than or equal to the predetermined tension value.

7. The child restraint system of claim 6, wherein the second device comprises a light-emitting diode, the controller further configured to induce the light-emitting diode to emit light having a first color when the first tension value is greater than or equal to the predetermined tension value.

8. The child restraint system of claim 1, further comprising a base portion comprising the first seat belt guide member and the second seat belt guide member.

9. The child restraint system of claim 1, wherein the second sensor comprises a piezo-resistive force sensor configured to adjust an amplitude of the second signal based on an amount of force applied to the second sensor by the vehicle seat belt webbing.

10. The child restraint system of claim 1, wherein the child seat comprises a rearward-facing child seat with respect to the vehicle seat.

11. The method of claim 10, further comprising positioning the child seat in either a rearward-facing position relative to the vehicle seat or a frontward-facing position relative to the vehicle seat.

12. The child restraint system of claim 1, wherein the child seat comprises a frontward-facing child seat with respect to the vehicle seat.

13. A method for monitoring installation of a child restraint system on a vehicle seat, the child restraint system having a child seat configured to receive a child occupant, the child seat having a first seat belt guide member and a second seat belt guide member configured to engage a vehicle seat belt webbing for securing the child seat to the vehicle seat, the method comprising:

outputting a first signal from a first sensor disposed on the first seat belt guide member of the child seat, the first signal indicative of an amount of tension being applied to the vehicle seat belt webbing at the first seat belt guide member;

computing a first tension value based on the first signal utilizing a controller; and outputting a second signal from a second sensor disposed on the second seat belt guide member of the child seat, said second signal indicative of an amount of tension being applied to the vehicle seat belt webbing at the second seat belt guide member; and inducing a first device disposed on the child seat to indicate when one of the first tension value and the second tension value is less than a predetermined tension value, utilizing the controller.

14. The method of claim 13, wherein the first device comprises a light-emitting diode, and the step of inducing the first device to indicate when the first tension value is less than the predetermined tension value comprises inducing the light-emitting diode to emit light having a first color when the first tension value is less than the predetermined tension value.

15. The method of claim 13, wherein the first device comprises an electrical annunciator, and the step of inducing the first device to indicate when the first tension value is less than the predetermined tension value comprises inducing the electrical annunciator to emit a first audible sound when the first tension value is less than the predetermined tension value.

16. The method of claim 13, wherein the first device comprises a liquid-crystal display, and the step of inducing the first device to indicate when the first tension value is less than the predetermined tension value comprises inducing the liquid-crystal display to display a first message when the first tension value is less than the predetermined tension value.

17. The method of claim 13, further comprising inducing a second device to indicate when the first tension value is greater than or equal to the predetermined tension value.

18. The method of claim 17, wherein the second device comprises a light-emitting diode, and the step of inducing the second device to indicate when the first tension value is greater than or equal to the predetermined tension value, comprises inducing the light-emitting diode to emit light having a first color when the first tension value is greater than or equal to the predetermined tension value.

19. The method of claim 13, wherein the child restraint system further comprises a base portion configured to receive and to hold the child seat therein, the base portion having a seat belt guide portion configured to receive the vehicle seat belt webbing thereon.

* * * * *